Figure 1:
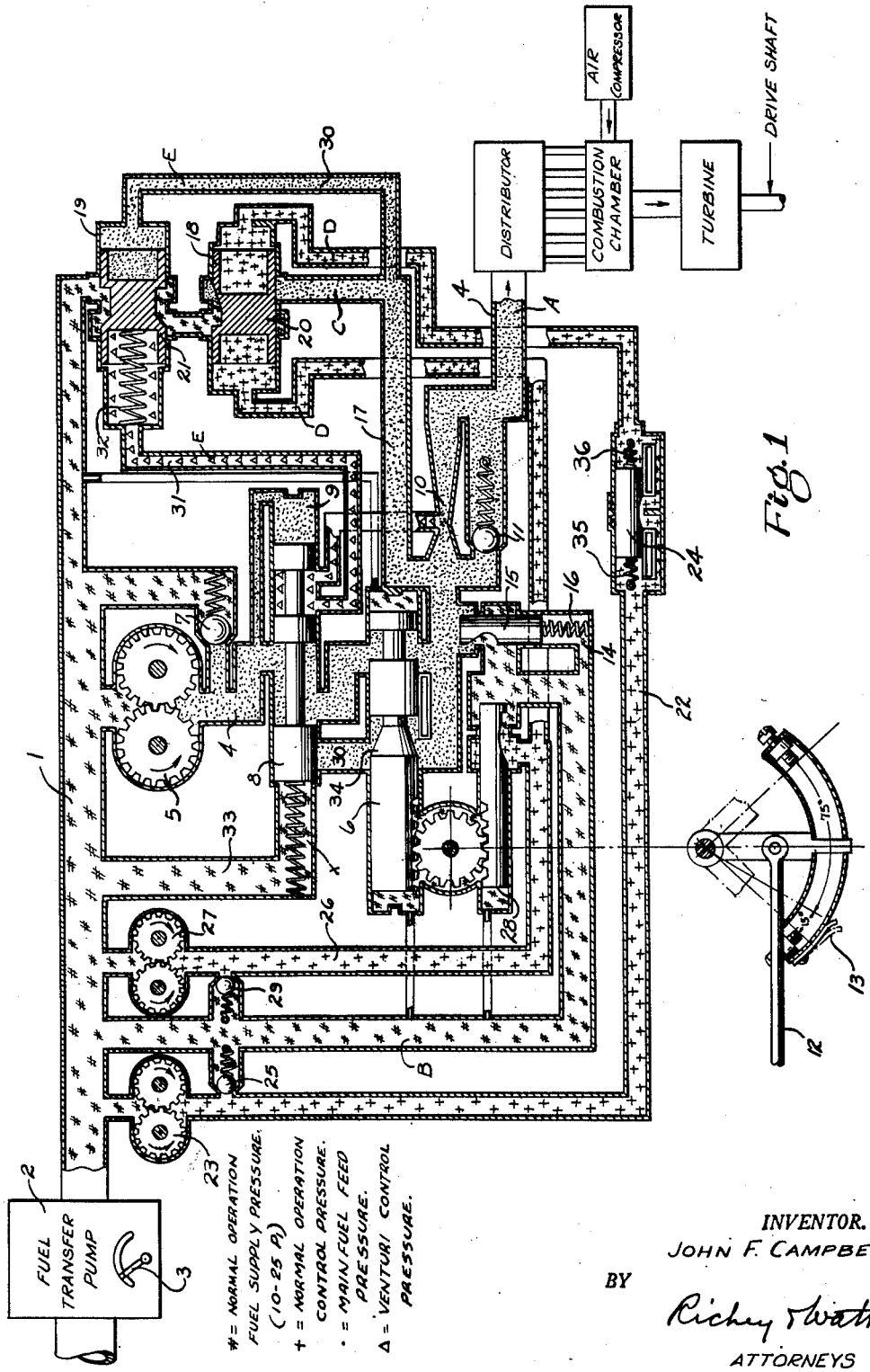

Patented May 5, 1953

2,637,374

UNITED STATES PATENT OFFICE 2,637,374

AUTOMATIC FUEL CONTROL FOR GAS TURBINE ENGINES

John F. Campbell, Euclid, Ohio, assignor to The Weatherhead Company, Cleveland, Ohio, a corporation of Ohio Application July 17, 1946, Serial No. 684,212

15 Claims. (Cl. 158—36.4)

The present invention relates generally to fuel flowing and distributing means and is particularly concerned with novel means for delivering liquid fuel to a gas turbine engine.

In the use of gas turbine engines, especially in aircraft as jet propulsion units, it is critically important that the speed of the turbine rotor, which largely determines the speed of the aircraft, be rapidly and accurately adjustable according to the pilot's requirements. Furthermore, it is desirable that rotor speed be automatically maintained constant at any speed, and that continuous engine operation be automatically assured, if desired, regardless of the altitude and immediate engine speed requirements of the pilot. The problem is complicated because of the load upon such engines, which conventionally are used to drive propellers or centrifugal air compressors, or both, varies widely over the altitude range in which the engines are used due to the wide variation in air density over that range.

Therefore an object of this invention is to provide means whereby the speed of the rotor of a gas turbine engine can be quickly and accurately altered while the engine is operating.

Another object is to provide means whereby the continuous operation of a gas turbine engine will be assured, if desired, under any practical altitude and engine speed circumstance, and said speed will automatically be maintained constant at any point within the operating range of speeds of the engine.

A further object is to provide means for automatically regulating flow of fluid in a conduit and preventing flow in either direction at a rate in excess of a predetermined minimum.

A still further object is to provide means for automatically regulating fluid pressure in a fuel supplying conduit for an engine in accordance with the fuel requirements of the engine at various engine speeds over a speed range wherein a straight line relation does not exist between engine speed and volume of fuel required by the engine.

Broadly, my invention resides in the translation of engine speeds into pressures and in the application of these pressures to regulate automatically and/or manually the energy input to the engine and the speed of the engine.

Figure 2:
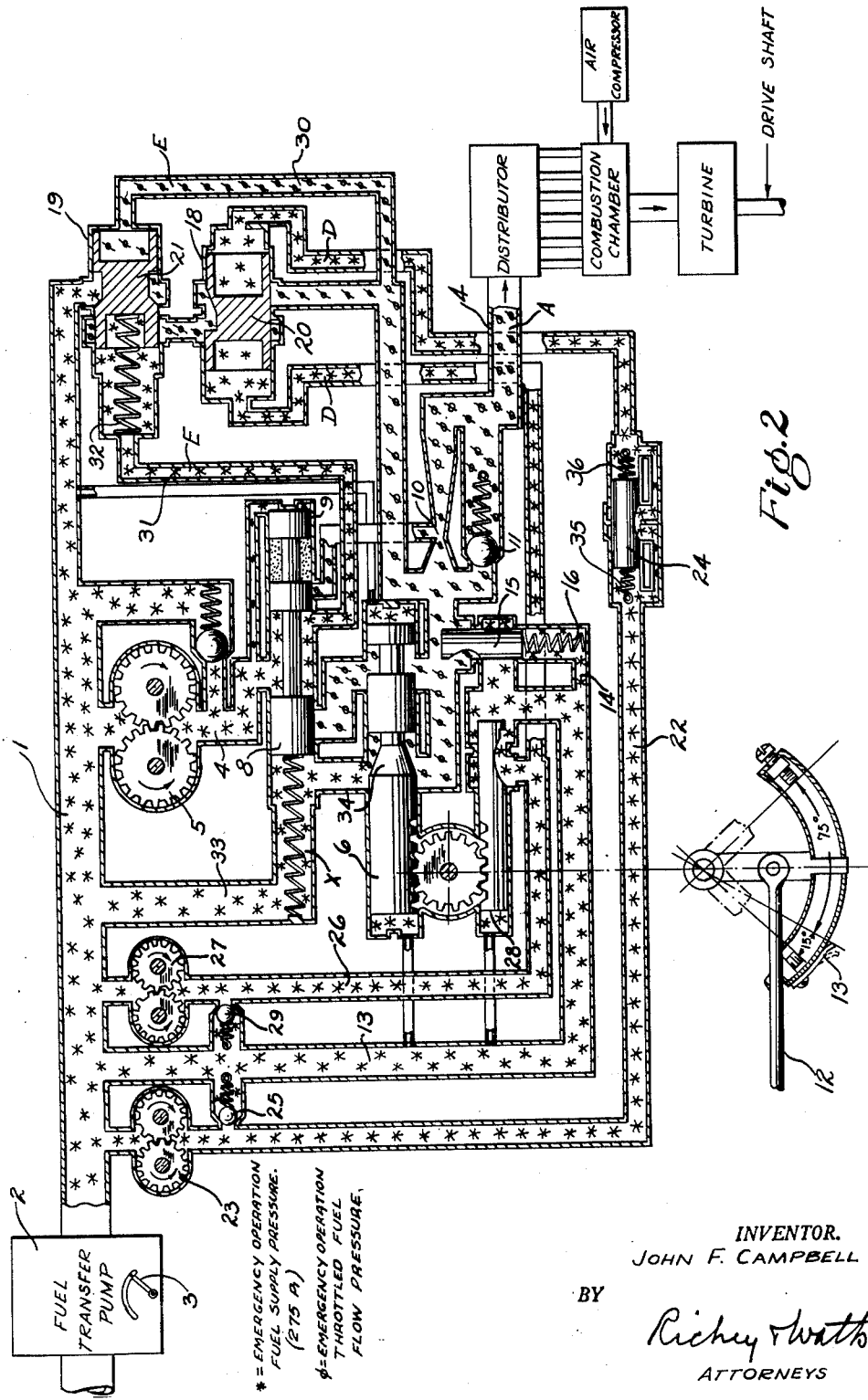
Figure 3:
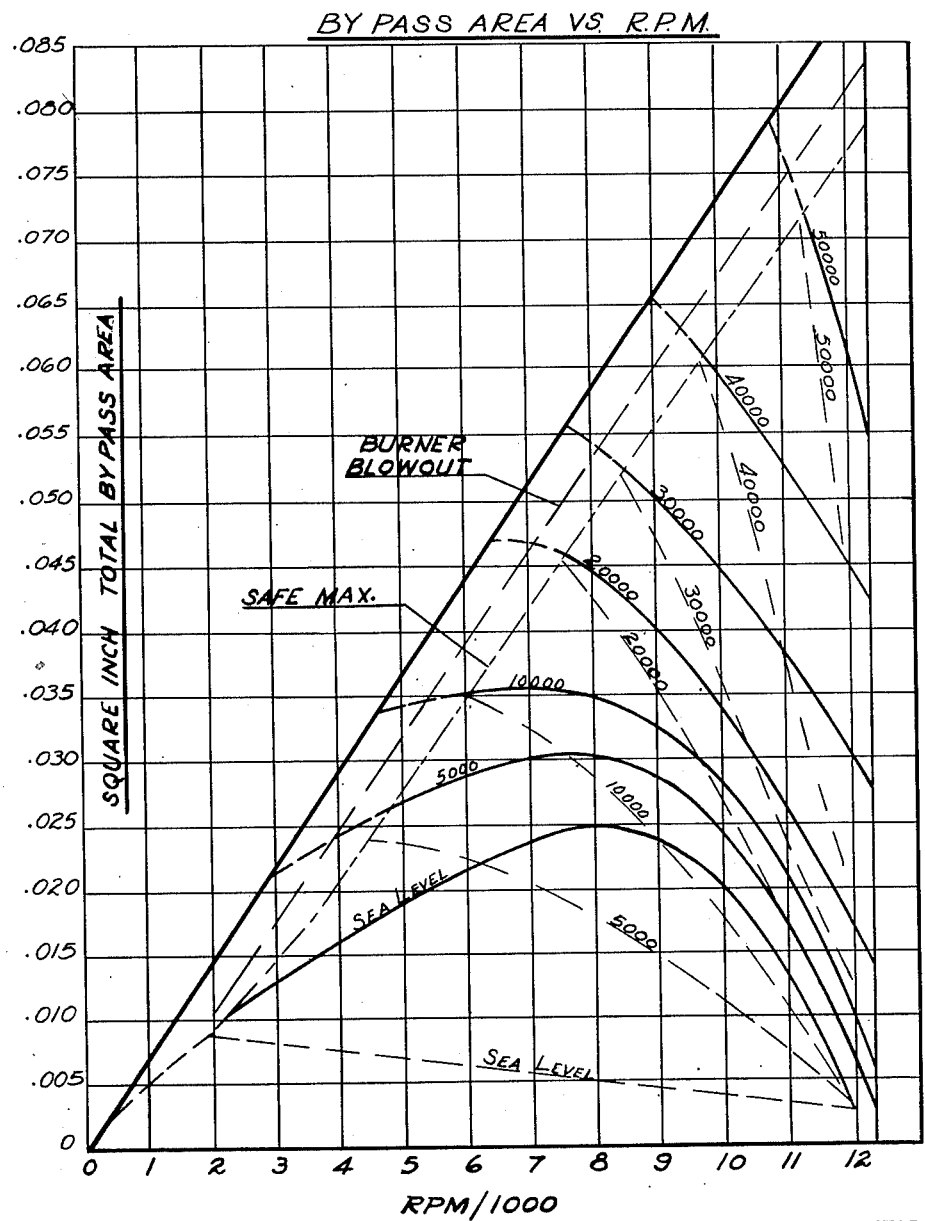

Referring to the drawings accompanying and forming part of this specification;

Figure 1 diagrammatically illustrates one form of speed regulating means of this invention in operating combination with a gas turbine engine, an air compressor, fuel distributor and a combustion chamber;

Figure 2 illustrates the assembly of Figure 1 in alternative or emergency operating combination; and Figure 3 is a chart bearing curves indicating relationships between engine speed and fuel volume at various speeds and altitudes.

The depicted flow control system of my invention comprises a fuel source and six functional parts or circuits, viz, fuel delivering conduit A, engine by-passing circuits B and C for bleeding the fuel delivering circuit, circuits D and E for regulating the fluid flow through by-passing circuit C, and an emergency circuit X for delivering fuel to the engine.

The fuel source comprises a reservoir (not shown), a multibranched header 1 joining the various circuits with the reservoir and thus enabling fuel flow to or from said circuits, as required; and a boost or transfer pump 2 between the reservoir and circuits for impressing the header with fuel (hydraulic) pressure as great as 275 p. s. i. in emergency circumstances and between about 10 and 25 p. s. i. in normal operations. Adjustment of this pump is manual and is accomplished by lever 3.

The fuel delivering conduit comprises a principal conduit 4 connecting header 1 with the fuel distributor for the engine, an hydraulic pump 5 geared to the engine and connected to said conduit to force fuel flow therethrough to the distributor, a throttle valve 6 in the conduit between pump 5 and the distributor, a constant pressure (700 p. s. i.) relief valve 7 between said throttle and pump for venting fuel to a branch of said header, a piston 8 between said valve and the throttle movable within enlarged cylindrical portion 9 of the conduit to prevent fuel flow between pump 2 and the throttle, and a venturi 10 and Venturi by-pass valve 11 in the conduit between said throttle valve and the fuel distributor. The throttle valve is connected to and actuated by pilot's lever 12, which is provided with idle stop 13 to moderately resist movement of said lever to close said valve. As indicated, this lever is disposed to move through 90° to regulate the position of said throttle valve from closed position to full open, and is limited in its movement through 15° from close to idle speed by the idle stop.

Circuit B consists simply of conduit 14, which is a branch of header 1, and spring-loaded valve 15 which serves to meter fuel from the section of conduit 4 between the throttle and venturi.

This valve is sprung against movement to permit fuel flow through this by-pass circuit and is disposed to permit such flow only when pressure within said conduit section exceeds 65 p. s. i. Because of the peculiar profiling of this valve, the reason for which will be fully set forth below, increases in fuel pressure urging valve movement to compress spring 16 at first bring increases and then decreases in the orifice area until the valve is finally closed at 340 p. s. i.

The second by-pass circuit (C) comprises a conduit 17 having two enlarged cylindrically-shaped portions 18 and 19, and connecting the section of conduit 4 between valve 15 and the venturi with header 1, and piston valves 20 and 21 within said cylindrically shaped portions for metering flow of fuel through said by-pass circuit by movement within cylinders 18 and 19, respectively, in accordance with the dictates of regulating circuits D and E, respectively.

Circuits D and E actually are two circuit pairs, one of which pairs constitutes circuit D and acts to position valve 20 and regulates its orifice area, and the other of which pairs constitutes circuit E and acts to position valve 21 to regulate its orifice area.

Circuit D comprises a conduit 22 connecting header 1 with an end of cylinder 18, a pump 23 between said header and cylinder for developing an hydraulic pressure in said cylinder and upon piston valve 20, a flow control valve 24 in the conduit between pump 23 and the cylinder, which is insensitive to pressure differences across it but acts in response to fluid flow to impede or entirely prevent such flow depending upon the tendency for that flow to occur, and a constant pressure 350 p. s. i. relief valve 25 between the pump and flow control valve for bleeding the circuit and limiting the hydraulic pressure within it. Pump 23 is geared to the turbine and even at idling speed has a capacity greater than necessary to maintain a pressure in conduit 22 in excess of 350 p. s. i.

Circuit D further comprises means for developing a pressure upon piston valve 20 opposing that developed by aforesaid portion of the circuit. This means includes conduit 26 connecting header 1 with the end of cylinder 18 opposite the end thereof opening into conduit 22, a pump 27 between said header and cylinder for developing an hydraulic pressure in said cylinder, manually adjustable engine speed selector valve 28 between said pump and cylinder for bleeding fuel to header 1 from conduit 26, and a constant 450 p. s. i. relief valve 29 between pump 27 and selector valve 28. The speed selector valve is actuated by the said throttle lever and is opened and closed when the throttle is opened and closed by the pilot.

Circuit E comprises a conduit 30 which connects one end of cylinder 19 with the portion of by-pass conduit 17 between the valve 20 and conduit 4. It further comprises a conduit 31 which connects the opposite end of said cylinder to the throat of venturi 10 and a spring 32 within the cylinder and extending between the piston valve and said opposite end of the cylinder. The conduit 31 communicates with cylindrical portion 9 of conduit 4 and is adapted to transmit Venturi throat pressure to cylinder 19 in normal operations and to be prevented from thus functioning by movement of piston 8 in accordance with emergency operating conditions.

The emergency circuit comprises, in addition to the transfer pump 2 and header 1, a branch 33 of the header which opens into conduit 4 in the section before the throttle valve and by-pass valve 15, the portion of conduit 4 between said opening and the fuel distributor, and a throttle valve 34 in said branch. Aforesaid piston 8 in normal operation is disposed to prevent flow of fuel to throttle valve 34, and in emergency operation is disposed to permit such flow and to prevent fuel flow from pump 5 to throttle valve 6. Throttle valve 34 is actuated by lever 12 and due to the arrangement of the system, engine operation is entirely manual, the automatically operating circuits being blocked and prevented from exerting any effect upon the fuel delivery rate to the distributor.

Referring now to Fig. 3, it will be seen that required total by-pass area in square inches is plotted against engine revolutions (thousands per minute) for various altitudes including sea level, 5000 ft., 10,000 ft., 20,000 ft., 30,000 ft., 40,000 ft. and 50,000 ft. The result is a family of solid line curves graphically illustrating the relation existing between engine fuel requirements and speeds under any speed or altitude circumstances from zero to 12,000 revolutions per minute and from sea level to 50,000 ft. Also plotted on the chart is the effective by-pass area of valve 20 under the various aforesaid altitude and engine speed circumstances. The result is the illustrated, appropriately labelled family of dotted line curves subtending to varying degrees, the corresponding solid line curves. The chart also bears a dotted line curve, indicating the safe maximum by-pass area over the operating range and labelled "Safe Max."; and another dotted line curve labelled "Burner Blowout" which indicates the total by-pass area over the operating range when fuel combustion ceases.

The total by-pass area over the full speed and altitude range is accounted for by valves 15 and 20. Thus the area defined between the dotted line curve for any altitude, representing the by-pass area accounted for by valve 20, and the corresponding solid line curve is accounted for by valve 15 which is appropriately profiled to produce this effect. The values set out of this chart are not to be construed as absolute or quantitative, or as imposing limitations upon the appended claims, and the relationships indicated are to be understood as qualitative only.

In the operation of the system illustrated, under normal circumstances, fuel is drawn from the reservoir and forced into header 1 by pump 2 under a hydraulic pressure of 10 to 25 p. s. i., which is depicted by the number (#) signs. A portion of this fuel is forced by pump 5 through conduit 4 past throttle valves and flowed to the fuel distributor and engine combustion chamber after receiving the controlling and modifying effects of by-passing circuits B and C. This flow of fuel to the combustion chamber is indicated in Fig. 1 by dots and is, of course, proportional to the speed of the engine at the outset of its travel through principal conduit 4. The fuel is finally delivered to the engine in accordance with the pilot's desires and according to requirements of safety which are automatically enforced by the system. Thus at constant speed a particular pressure schedule obtains in the principal conduit, and while in different portions of the conduit pressures are different and flow rates are increased or diminished, combustion chamber operation proceeds at a practically invariable rate and engine speed is accordingly invariable.

Other portions of fuel in said header are forced by pump 23 into conduit 22 and by pump 27 into conduit 26 and are regulated in their flow by valves 25 and 28, respectively. The presence of fuel under pressure in these conduits is indicated in Fig. 1 by the plus signs (+). Obviously, since there is no means except valve 25 for venting fuel from conduit 22, fuel flow through that valve must occur constantly and in volume equal to that delivered by the pump 23, with the exception that negligible volume changes in the system occur because of changes in disposition of valve 20. At constant engine speed there is, also obviously, a continuous flow from conduit 26 through valve 28, corresponding in volume to that delivered by pump 27.

As for the disposition of the above described parts affecting the fuel flow in such constant speed operation, all are substantially stationary and the flow through the by-passing circuits (B and C) is constant, pressure being balanced across the various valves 15, 20 and 21.

Assuming that the pilot desires to increase engine speed and adjusts the control lever 12 accordingly, the aforedescribed equilibrium situation is destroyed and the operation of the system and the disposition of many of its moving parts undergoes a considerable change. First, movement of said lever to increase engine speed causes movement of the throttle 6 to allow more fuel to flow through the principal conduit and causes movement of speed selector valve 28 in the opposite direction resulting in the by-passing of a greater volume of fuel from conduit 26. For the moment only, engine speed remains unaffected and unchanged; but with the increased flow of fuel from conduit 26 to the header, the hydraulic pressure within the conduit diminishes and valve 20 moves in accordance with the constant pressure exerted through conduit 22 and closes to some extent or entirely, thus decreasing or preventing flow of fuel through by-passing circuit C. Greater flow of fuel to the distributor and combustion chamber ensues almost immediately and the gas pressure developed in the combustion chamber is constantly increased and the pressure exerted upon the turbine engine rotor is increased accordingly, as is the speed of the engine. With the increase in engine speed there immediately results a corresponding increase in the speed of the pumps 5, 23 and 27. Obviously, one effect of this pump speed increase is to overcome the pressure-reducing effect of the increased orifice described by valve 28 as a result of aforesaid movement of control lever 12, and to increase the hydraulic pressure in conduit 26, to cause movement of valve 20 opposite to the influence of the constant hydraulic pressure (350 p. s. i.) carried in conduit 22. This movement of valve 20 continues until balance between the hydraulic pressures applied against the opposed sides of the piston is established and fuel flow through the by-pass circuit is restored at the rate necessary to maintain fuel flow to the fuel distributor at the level required for the engine speed desired by the pilot, as indicated by the setting of lever 12.

On the other hand, if the speed of the engine is to be reduced in accordance with pilot's requirements and lever 12 is accordingly disposed to accomplish this, the first effect is to simultaneously decrease the volume of fuel supplied to the distributor per time unit, by closing the throttle valve 6, and to increase the pressure schedule in conduit 26 by restricting the orifice described by valve 28. It will be obvious that movement of valve 20 in the direction opposed to the 350 p. s. i. pressure applied to the piston valve, as described, will follow; and with the valve 20 opened, or moved at least to a more open position, flow of fuel through the by-pass circuit C from the principal conduit to header 1 will be increased in volume. Also, it will result in increased fuel by-passing of valve 15, assuming operation of the engine at the time adjustment is undertaken in higher speed ranges, since it will relieve the pressure against the spring load of that valve and allow it to move toward its normally closed position, but only to the point at which that valve is open to the greatest extent. These effects, of course, will all be reflected in a considerable and very abrupt decrease in the volume of fuel delivered to the combustion chamber, and consequently, in a corresponding decrease in the gas pressure applied to the turbine rotor. Turbine speed will thereupon abruptly decrease and pumps 5, 23 and 27 in the various circuits of this system will correspondingly decelerate. The effect in the principal conduit will not be particularly important so far as the volume of fuel effluent to the distributor is concerned, because the various volume controlling the valves aforedescribed will have already and will continue to determine that volume regardless of pump 5. The change in speed of pump 23 likewise will be unimportant inasmuch as at any turbine speed hydraulic pressure is maintained in conduit 22 at a constant value, that is, 350 p. s. i. because of the aforementioned constant pressure valve. Change in speed of the pump supplying hydraulic pressure to conduit 26, is however, very noticeable and important inasmuch as it reduces the pressure applied against the valve 20 by bringing the volume of fuel delivered by that pump into agreement, as far as quantities are concerned, with the volume by-passed by valve 28. Valve 20 then is gradually brought into an equilibrium position as the constant pressure applied by the constant pressure circuit (conduit 22, etc.) and the variable pressure applied by the variable pressure circuit (conduit 26, etc.) become equal at a point which allows fuel flow through the by-pass line in accordance with the engine and aircraft speed requirements of the pilot.

If engine speed is abruptly decreased through a considerable range or if the decrease occurs in certain altitude ranges where burner blowout is likely to occur with moderate speed decreases, fuel combustion has a tendency to stop. Such failure of the power source is dangerous because rekindling burners is ordinarily impossible for a long period after operation in the higher speed ranges, especially under flight conditions. The aforementioned second by-pass flow control circuit E is therefore provided and operates to maintain fuel to the combustion chamber above minimum safe operating levels. During normal operation, when equilibrium obtains in the system, valve 21 is not disposed to interfere with fuel flow through the by-pass circuit. The same situation prevails when the engine is accelerated and the fuel flow through the principal conduit is increased correspondingly. However, when the schedule of fuel delivery to the combustion chamber is decreased, and especially when it is decreased over a considerable range of pressures, valve 21 overrules valve 20 which, as explained, is then disposed to permit rapid flow of fuel through the by-pass line, and valve 21 substantially prevents or drastically limits fuel flow through that line, depending upon the proximity of the pressure in the principal conduit to dangerously low levels. By way of example, assuming that flow through venturi 10 falls to a relatively low value, the pressure in conduit 31, which is indicated in Fig. 1 by the triangle (△) signs, is thereby correspondingly increased in accordance with well known fluid flow principles and the valve 21 is unbalanced, the pressure urging its closure being greater than the pressure tending to maintain it. Spring 32 is carefully adjusted in order that delicate balance of opposing pressures across the piston of valve 21 may be obtained and in order that closure of the valve will occur when control afforded by that valve is essential to continued safe operation of the turbine engine. In the higher speed ranges, of course, the pressure developed in conduit 31 is relatively small due to the rapid rate of flow of fuel through the Venturi throat. Under this circumstance the valve, of course, remains in its open position and does not interfere with the dictates of valve 21 as to the fuel flow schedule through the by-pass line.

In the event that the speed of the engine is sufficiently great to cause the establishment of a pressure in the principal conduit and upon valve 15 in excess of the pressure required to cause opening of that valve against opposition of spring 16, and to cause fuel flow from the principal conduit to header 1, an adjustment to increase the speed of the engine will cause movement of the valve further in the direction against the spring load. Depending upon the degree to which the valve has thus been moved, there results an increase in the volume of fluid by-passed by means of that valve, or a decrease in that volume.

It will be noted that valve 15 is profiled in a particular and novel manner and that valve 20 is profiled in a substantially opposite manner to meter flow of fuel from the principal conduit. These profiles are carefully matched to establish the necessary by-pass area for any given engine speed and altitude circumstance. Since the pump 5 is geared to the engine and operates at a rate corresponding to that of the engine, and since in some altitude and engine speed ranges the capacity of the pump is too great to maintain a given engine speed, provision must be made to compensate for the differences. In other words, the pump output under certain circumstances is greater than the fuel flow requirement and it is necessary to provide by-pass means functioning oppositely to the dictates of the valve 20, which is profiled generally as though a straight line relation existed between engine speed and engine fuel requirements.

The necessity and function of this second by-pass valve and circuit is readily appreciated upon consideration of Fig. 3 which clearly illustrates the typical "humped" curve defining the fuel efficiency of the engine over a range of speeds. The efficiency, in other words, varies with speed so that the amount of fuel required per revolution decreases with increases in speed to a point of maximum efficiency and then increases with increases in speed. As a result, at any given altitude the total by-pass area in the fuel delivery system must increase with increases in speed to a point of maximum engine efficiency, and then decrease with further increases in speed in order that engine fuel requirements can be met. At higher altitudes the total by-pass area must increase with increases in altitude because with a constant throttle setting, the engine R. P. M. tends to increase because the load upon the engine is lessened due to the lesser density of the atmosphere. Obviously no single valve responsive only to pressure impulses, such as valve 20, can be suitably profiled for use over the entire speed range of the gas turbine engine because such a valve would, under certain circumstances, function to increase the flow of fuel to the engine when the opposite effect was desired as indicated by the direction of throttle movement, and would function to decrease such flow when an increase of such flow is desired. For instance, assume that profile of valve 15 is superimposed upon profile of valve 20 to define the by-pass area necessary, as indicated under any sea level engine speed circumstances set out in Fig. 3, and assume movement of the throttle to decelerate the engine from 8,000 to 5,000 revolutions per minute. Reference to the sea level solid line curve of Fig. 3 indicates that a decrease in the total by-pass area is necessary but it will be obvious that movement of valve 20 resulting in such decreases can result only in increase in speed of the engine. The operation of circuit D is such that to accomplish deceleration it is necessary to displace valve 20 to increase the by-pass area and permit more fuel to by-pass the engine. It is clear that operation in this assumed manner could therefore result only in increase in the turbine speed, contrary to the dictates of the throttle lever, and a progressive increase in the speed of the engine due to the increase in output of the pumps 5 and 27 and the resulting continued movement of valve 20 to further restrict the by-pass area and to cause progressively greater volume of fuel flow to the engine. Valves 15 and 20 are therefore provided and they are arranged to compensate automatically for these variations in engine fuel requirements.

At the point of maximum efficiency of the turbine engine, valve 15 floats in such a way that a maximum of by-pass area is defined by the valves 15 and 20. Movement of the throttle lever to increase or decrease engine speed causes an increase or a decrease in the pressure against valve 15 exerted by fuel in conduit 4, which results in movement of valve 15 to decrease by-pass area. When the throttle is advanced, the fluid (fuel) pressure upon valve 15 is increased and the valve is urged against spring 16; movement of the throttle to decrease engine speed results in relief to an extent of fluid pressure on valve 15 and movement of said valve in response to urging of spring 16.

As to operating the system under emergency circumstances, transfer pump 2 speed is manually increased by appropriate movement of lever 3 and fuel is delivered into the header under 275 p. s. i. pressure, which is indicated in Fig. 2 by the asterisk (*) signs. Displacement of the emergency circuit control piston 8 immediately results and opens the way for fuel flow through arm 33 of the header, past manually operated throttle control valve 34 which is actually a part of throttle 6, and thence through the venturied principal conduit 4 to the fuel distributor and combustion chamber. Fuel thus throttled is depicted by the Greek letter phi (φ). Pumps 5, 23 and 27 continue to operate, being geared to the turbine engine, but their effect is not felt either in regulating the rate of flow of fuel to the fuel distributor or in actually causing fuel to flow through the system to the distributor. This is because valve 21 is moved to the closed position by pressure in line 31 as a result of movement of emergency control piston 8 to the right under action of pressure in conduit 33. Since valve 21 has moved to close off by-pass circuit C, the position of valve 20 in response to pressures from control pumps 23 and 27 has no effect on fuel flow. Valve 15 is likewise disposed in closed position as a result of being subjected to the transfer pump hydraulic pressure in line 14, which pressure is resisted only by the lesser hydraulic or throttled pressure in that portion of the principal conduit 4 disposed between the fuel distributor and throttle valve 34. There is, as a result, no flow of fuel through by-pass circuit B, and since by-pass circuit C has been closed by valve 21, manual control of pilot line 12 alone determines the rate of flow of fuel to the engine. The pressure at which the fuel reaches the fuel distributor is indicated in Fig. 2 by the phi ($\phi$) signs, and this pressure determines speed of the engine.

Obviously, there are various equivalent means of accomplishing applicant's purposes and other combinations of the means depicted and described herein, but these are contemplated by the appended claims wherever the departure from this disclosure is not material.

Other means than the flow control valve 24 might be employed to eliminate or minimize surging in the constant pressure circuit and to maintain the proper rate of travel of valve 20 and minimize disagreement between actual and permitted rates of change of speed of the engine. Valve 24 comprises a generally C-shaped member disposed between springs 35 and 36 for movement as aforementioned within conduit 22 to regulate fluid flow through said conduit by engaging, through either point of the C, the annular fin in said conduit or by moving toward or away from such an engagement. As illustrated in Figs. 1 and 2, this valve is capable of making a fluid tight contact with the fin to prevent flow of fluid in either direction through the conduit whenever the tendency for such flow becomes greater than a predetermined mimimum for which springs 35 and 36 are adjusted. The various pumps or any of them might be driven by other power sources than the turbine, in which case appropriate circuits could be evolved from the teachings thereof without departing from the spirit of my invention.

Fuel delivered to the combustion chamber of the turbine engine by the foregoing means is ignited therein. The combustion gases are vented from the chamber to the turbine rotor which drives the air compressor of the assembly. The air compressor therein delivers air under substantial pressure into the combustion chamber in an amount substantially in excess of the stoichiometric requirement for complete oxidation of the fuel. The excess of air assists the propulsive effort of the turbine and the jet through which the gases are broken down and are vented from the aircraft.

The fuel distributor, like the turbine engine and the air compressor depicted in the drawings, does not constitute a part of this invention and may, of course, be of any desired construction or design.

The pressures stated herein are offered for purposes of illustration only and are not to be construed as imposing limitations upon the appended claims in any respect.

Having thus described the present invention, I state that what I desire to secure by Letters Patent is defined in what is claimed.

What is claimed is:

1. Fuel delivering means for a gas turbine engine comprising a fuel delivery conduit, a by-pass conduit bleeding said fuel delivering conduit and by-passing said engine, means for varying the rate of flow of fuel through said by-pass conduit to effect desired changes in engine speed including a valve in said by-pass conduit positionable to regulate the flow of fuel therethrough, and means for automatically maintaining the rate of flow of fuel through said fuel delivery conduit above a predetermined minimum, said last-named means including a second valve in said by-pass conduit, means to close said second valve when the fuel flow in said delivery conduit falls below a predetermined minimum, closing of said second valve completely closing said by-pass conduit.

2. Fuel delivery means for a gas turbine engine comprising a fuel delivery conduit, a second conduit bleeding said fuel delivery conduit and by-passing said engine, a free-floating valve in said second conduit positionable to adjust the rate of fuel flow therethrough, means for positioning said valve including means for developing a substantially constant fluid pressure urging movement of said valve in one direction to decrease said rate and means for developing a fluid pressure which varies with engine speed urging the valve in the other direction to increase said rate, said variable and constant pressures balancing said floating piston at constant engine speed, and control means to vary said variable pressure independently of engine speed.

3. Fuel delivery means for a gas turbine engine comprising a fuel conduit, a second conduit bleeding said fuel delivery conduit and by-passing said engine, means for causing fuel flow through said conduits including a pump arranged to be driven by the engine, a metering valve in said second conduit positionable to adjust the volume of fuel by-passing the engine, means for positioning said valve including means for developing a substantially constant fluid pressure urging movement of said valve in one direction to decrease said volume and means for developing a fluid pressure which varies with engine speed urging the valve in the other direction to increase said volume, said variable and constant pressures balancing said valve at constant engine speed, and control means to vary said variable pressure independently of engine speed.

4. Fuel delivery means for a gas turbine engine comprising a valve positionable to adjust the rate of delivery of fuel to said engine, and means for positioning said valve, said positioning means including means for developing a substantially constant pressure urging movement of said valve in one direction to increase said rate and means including an hydraulic pump arranged to be driven by the engine for developing pressure which varies with engine speed urging said valve in the other direction to gradually decrease said rate of fuel flow, said variable and constant pressures balancing said valve at constant engine speed, and means for varying said variable pressure independently of engine speed comprising manually controllable means for bleeding the pressure developed by said hydraulic pump before it reaches said valve.

5. Fuel delivery means for a gas turbine engine comprising a fuel delivery conduit having a branch connected to said engine and two branches by-passing said engine, a piston valve in one of said branches positionable to adjust the rate of fuel flow therethrough, means for positioning said valve including means for developing a substantially constant fluid pressure urging valve movement in one direction to decrease said rate and means for developing a fluid pressure which varies with engine speed urging valve movement in the other direction to increase said rate, said variable and constant pressures balancing said piston at constant engine speed, control means to vary said variable pressure independently of engine speed, and means for adjusting the rate of fuel flow through the other by-pass branch including a pressure sensitive metering valve.

6. Fuel delivering means for a gas turbine engine comprising a fuel delivering conduit having a branch for delivering fuel to the engine, and two branches adapted for by-passing the engine, and a hydraulic pump arranged to be driven by said engine, and disposed within said conduit for causing fuel flow through said conduit, a piston valve in one of said branches positionable to adjust the rate of fuel flow through said branch, means for positioning said valve including means for establishing a substantially constant fuel pressure urging valve movement in one direction to decrease said rate, and means for developing a fluid pressure which varies with said speed urging valve movement in the other direction to increase said rate, said valve and constant pressures balancing said piston at constant engine speed, and control means to vary said variable pressure independently of engine speed, means for adjusting the rate of fuel flow through the other by-pass branch including a pressure sensitive metering valve profiled to compensate for discrepencies between engine fuel requirements and fuel pumping capacity of said hydraulic pump at varying engine speeds.

7. A system for delivering fuel to a gas turbine engine comprising an engine feeding line, a line bleeding said feeding line and arranged for by-passing the engine during normal operation, a normal fluid circuit for supplying said feeding line with fuel and an emergency source of fuel under pressure connectable to said feeding line, said normal circuit including a control valve positionable to adjust the rate of flow of fuel through said by-pass line, and an emergency fluid circuit including means for connecting said emergency source to said engine feeding line and means for preventing flow through said by-pass line upon operation of said connecting means.

8. A fuel feeding system for a variable speed engine comprising a fuel supply pump arranged to be driven at a speed proportional to engine speed, fuel supply means for said pump, a fuel delivery conduit for conducting fluid from said pump to the engine, by-pass conduit means connecting said delivery conduit to said fuel supply means, and regulating means for controlling fuel flow through said by-pass means, said regulating means comprising a profiled by-pass valve for controlling flow through said by-pass conduit, means for urging said by-pass valve in one direction with a substantially constant force, means for urging said by-pass valve in the other direction with a force that is a substantially linear function of engine speed, any difference between said forces tending to open the by-pass valve as engine speed increases, means to manually adjust the force of one of said means acting on the by-pass valve, said by-pass valve being substantially free-floating with respect to said opposed forces and balanced with respect to fluid in the by-pass conduit.

9. A fuel feeding system for a variable speed engine comprising a fuel supply pump arranged to be driven at a speed proportional to engine speed, fuel supply means for said pump, a fuel delivery conduit for conducting fluid from said pump to the engine, by-pass conduit means connecting said delivery conduit to said fuel supply means, and regulating means for controlling fuel flow through said by-pass means, said regulating means comprising a by-pass valve for controlling flow through said by-pass conduit, means for urging said by-pass valve in one direction with a substantially constant force, means for urging said by-pass valve in the other direction with a force that is a substantially linear function of engine speed, any difference between said forces tending to open the by-pass valve as engine speed increases, means to manually adjust the force of one of said means acting on the by-pass valve, said by-pass valve being balanced with respect to fluid in the by-pass conduit, and compensating by-pass means responsive to fuel pressure in said fuel delivery conduit arranged to by-pass a maximum quantity of fuel at an engine speed where fuel requirements per revolution are a minimum and to by-pass a lesser quantity at both greater and lesser speeds.

10. A fuel feeding system for a variable speed engine comprising a fuel pump arranged to be driven at a speed directly proportional to engine speed, fuel supply means for said pump, a fuel delivery conduit for conducting fluid from said pump to the engine, by-pass conduit means connecting said delivery conduit to said fuel supply means, and regulator means for controlling fuel flow through said by-pass means, said regulator means comprising a by-pass valve in said by-pass conduit, a source of fuel at constant pressure tending to close said by-pass valve, a source of fuel at a pressure proportional to engine speed tending to open said by-pass valve as engine speed increases, and means to manually adjust the pressure developed by one of said pressure sources, said by-pass valve being balanced with respect to pressure in said by-pass conduit.

11. A fuel feeding system for a variable speed engine comprising a fuel pump arranged to be driven at a speed directly proportional to engine speed, fuel supply means for said pump, a fuel delivery conduit for conducting fluid from said pump to the engine, by-pass conduit means connecting said delivery conduit to said fuel supply means, and regulator means for controlling fuel flow through said by-pass means, said regulator means comprising a by-pass valve in said by-pass conduit, a source of fuel at constant pressure tending to close said by-pass valve, a source of fuel at a pressure proportional to engine speed tending to open said by-pass valve as engine speed increases, and means to manually adjust the pressure developed by one of said pressure sources, said by-pass valve being balanced with respect to pressure in said by-pass conduit, second by-pass means for connecting said delivery conduit to said fuel supply means, a valve in said second by-pass means arranged to by-pass a maximum quantity of fuel when the engine is operating at its most efficient speed, said second by-pass means being arranged to by-pass a reduced quantity of fuel at other speeds.

12. A fuel supply and regulating system for a variable speed engine comprising a source of fuel under pressure for said engine, a by-pass for said source of fuel, a first valve in said by-pass engine speed responsive governor means including an engine speed responsive device for said first valve controlling the flow of fluid through said by-pass, means for manually adjusting the governor means to produce a predetermined engine speed, a second by-pass for said source of fuel, means for controlling flow through said second by-pass comprising second valve means responsive to fuel pressure in said source, said second valve means being in maximum by-pass position at intermediate fuel source pressures and at reduced by-pass positions at higher and lower fuel source pressures in order to compensate for discrepancies between engine fuel requirements per revolution at various engine speeds.

13. A fuel supply and regulating system for a variable speed engine comprising a source of fuel under pressure for said engine, a by-pass for said source of fuel, a first valve in said by-pass engine speed responsive governor means including an engine speed responsive device for said first valve controlling the flow of fluid through said by-pass, means for manually adjusting the governor means to produce a predetermined engine speed, and means responsive to fuel flow to said engine for closing said by-pass when fuel flow reaches a predetermined minimum, a second by-pass for said source of fuel, means for controlling flow through said second by-pass comprising second valve means responsive to fuel pressure in said source, said second valve means being in maximum by-pass position at intermediate fuel source pressures and at reduced by-pass positions at higher and lower fuel source pressures in order to compensate for discrepancies between engine fuel requirements per revolution at various engine speeds.

14. For use with an internal combustion engine, a fuel regulating system for automatically maintaining engine speed constant by controlling the fuel supply of the engine comprising a fuel supply pump with an outlet pressure proportional to engine speed, an engine feeding line leading from the pump to the engine, valve means having a connection to said engine feeding line to modify the pressure in said engine feeding line, a separate control system for said valve means comprising means driven by the engine and connected for positioning said valve means to modify fuel pressure in said engine feeding line as engine speed varies from a selected speed, and compensating valve means to further modify said pressure and compensate for the non-linear relationship between the fuel supply from said pump at a given engine speed and the fuel requirement of the engine at that speed, said compensating valve means being connected to said engine feeding line and arranged so that it is in intermediate position at intermediate fuel line pressures upon which a minimum quantity of fuel is allowed to pass to the engine by the valve, an increase or decrease in fuel line pressure increasing the fuel allowed to pass to the engine by the valve.

15. In a gas turbine, a fuel supply system comprising an engine feed line, a source of fuel under pressure for said engine feed line, a venturi in said feed line, and automatic means for controlling the flow of fuel in the feed line including a valve in said fuel feed line and an engine speed-responsive governor for controlling said valve, a burner blow-out protective system comprising auxiliary valve means connected to said feed line and movable to increase fuel pressure in said feed line independently of said automatic controlling means, and a pilot line leading from the throat of said venturi to said auxiliary valve means arranged so that pressure increase in said pilot line causes the auxiliary valve to move to increase fuel pressure in the feed line, whereby a reduction in fuel flow through the venturi below a predetermined minimum causes pressure in said pilot line to increase and the auxiliary valve operates to maintain fuel flow in said venturi at said minimum value.

JOHN F. CAMPBELL.

References Cited in the file of this patent

UNITED STATES PATENTS

| Number | Name | Date |
|---|---|---|
| 1,854,722 | Tarisien | Apr. 19, 1932 |
| 2,330,558 | Curtis | Sept. 28, 1943 |
| 2,405,888 | Holley, Jr. | Aug. 13, 1946 |
| 2,407,115 | Udale | Sept. 3, 1946 |
| 2,440,371 | Holley | Apr. 27, 1948 |
| 2,446,523 | Bradbury | Aug. 10, 1948 |